United States Patent [19]
Bartol

[11] 4,155,172
[45] May 22, 1979

[54] ARROW STRAIGHTNESS GAUGE

[76] Inventor: James D. Bartol, 3489 Treeline Dr., Murrysville, Pa. 15668

[21] Appl. No.: 837,713

[22] Filed: Sep. 29, 1977

[51] Int. Cl.² ........................... G01B 3/34; G01B 5/20
[52] U.S. Cl. ................................ 33/174 Q; 33/174 P; 273/106.5 R
[58] Field of Search ............ 33/174 Q, 174 R, 178 D, 33/174 P, 180 R; 273/106.5 R; 140/147; 72/34

[56] References Cited
U.S. PATENT DOCUMENTS

| | | | |
|---|---|---|---|
| 873,628 | 12/1907 | Stivers | 273/106.5 R |
| 3,568,732 | 3/1971 | Kelly | 140/147 |
| 4,048,726 | 9/1977 | LeFebvre | 33/180 R |

*Primary Examiner*—Richard E. Aegerter
*Assistant Examiner*—Willis Little
*Attorney, Agent, or Firm*—Harold A. Williamson

[57] ABSTRACT

The arrow straightness gauge of this invention has an elongated body of a preselected length. A circular cross-sectional passageway traverses the entire length of the elongated body and provides openings at both ends of the elongated body. The aforementioned arrow shaft has a preselected diameter and a preselected length. The circular cross-sectional passageway is provided with an internal diameter greater than the arrow shaft diameter, such that when the arrow shaft is inserted axial through the circular cross-sectional passage there is established a diametral clearance between the arrow shaft to be tested and the internal diameter of the circular cross-sectional passageway. The circular cross-sectional passageway has a diameter equal to the arrow shaft diameter to be tested plus a measurement in the range of between 0.003 and 0.023 times the arrow shaft diameter to be tested. The elongated body of the arrow shaft straightness gauge has a length no less than 0.1 the arrow shaft length the straightness of which is to be tested. The elongated body of the gauge is fashioned of the same material composition as the arrow shaft to be tested.

4 Claims, 4 Drawing Figures

ARROW STRAIGHTNESS GAUGE

This invention relates to an arrow shaft straightness test or gauge.

More specifically, this invention relates to a completely portable arrow shaft straightness tester for use in combination with an arrow shaft the straightness of which is to be ascertained.

In the archery field, the advent of more powerful bows such as the compound bow have required the complimentary use of arrows whose shafts are exceedingly strong, straight and lightweight. The arrow that most nearly meets these requirements is the now popular metal tubular arrow which is commonly made of aluminum. These aluminum arrows, while ideally suited for the use, have an inherent deficiency that arises as a result of their use in the field. This deficiency finds itself expressed in the arrow shaft's tendency to become slightly bent as a result of impact or upon removal from an object by an archer who applies a bending movement to the arrow shaft that exceeds the elastic limit of the arrow shaft material. Quite often the bend that is set into the arrow as a result of these happenings in the field is so slight as not to be readily perceived by the naked eye. These slight bends affect the arrow's stabilities in flight and, therefore, the accuracy of the archer employing such arrow is diminished.

An arrow with just such a slight bend if detected, could be straightened by one of a number of devices that are designed to straighten arrow shafts with bends therein. These devices are of the type shown in the patents to Groves, U.S. Pat. No. 2,876,822 and Lock, U.S. Pat. No. 3,846,998. While both of these patented structures provide for an arrow straightness check as well as a mechanism to remove bends detected in the arrow, they are bulky and are portable only in the sense that they can be carried from one place to another. These patented devices, because of their size, cannot be readily carried with or by the archer as he practices his archery skills in the field.

It is important to recognize that an arrow shaft that has even a slight and visually imperceptable bend in it, in such a condition, under continued normal use will have the bend increase. This increase in the bend is due to the well-known physical properties of a column or tube structure tendency to bend or buckle under axial compressive loading if the column or tube is anything but perfectly straight.

How then can the archer in the field during a day's excursion quickly ascertain the trueness of his arrow shaft's straightness? The answer to this question is provided for completely in the invention to be described more fully hereinafter.

It is, therefore, a primary object of this invention to provide an arrow shaft's straightness tester or gauge that epitimizes the limits of simplicity, yet is rugged in its construction.

Another object of this invention is to provide an arrow shaft straightness tester that is completely portable and may be easily carried on the person of the archer who wishes to check his arrow's straightness.

Yet another object of this invention is to provide an arrow shaft straightness tester that can be employed without regard to the ambient temperature of the field environment in which it is employed.

In the attainment of the foregoing objects, the invention provides a completely portable, easily carried on the person arrow shaft straightness tester or gauge for use in combination with an arrow shaft the straightness of which is to be checked.

The arrow straightness gauge has an elongated body of a preselected length. A circular cross-sectional passageway traverses the entire length of the elongated body and provides openings at both ends of the elongated body. The aforementioned arrow shaft has a preselected diameter and a preselected length. The circular cross-sectional passageway is provided with an internal diameter greater than the arrow shaft diameter, such that when the arrow shaft is inserted axial through the circular cross-sectional passage there is established a diametral clearance between the arrow shaft to be tested and the internal diameter of the circular cross-sectional passageway. The circular cross-sectional passageway has a diameter equal to the arrow shaft diameter to be tested plus a measurement in the range of between 0.003 and 0.023 times the arrow shaft diameter to be tested. The elongated body of the arrow shaft straightness gauge has a length no less than 0.1 the arrow shaft length the straightness of which is to be tested. The elongated body of the gauge is fashioned of the same material composition as the arrow shaft to be tested.

In the preferred embodiment of the invention, the elongated body of the gauge is provided with a casing physically surrounding the elongated body. The casing is provided with openings at either end to allow access to the openings at either end of the elongated body of the gauge. The casing, in turn, is further provided with means to readily secure and release the casing from the body of the person employing the gauge.

Other objects and advantages of the present invention will become apparent from the ensuing description and the illustrative embodiment thereof, in the course of which reference is made to the accompanying drawings in which.

Figure 1:
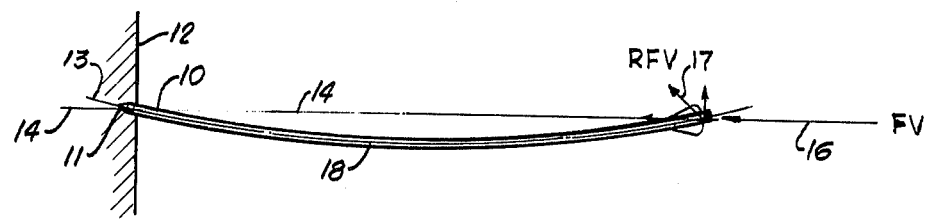
FIG. 1 is a flexed arrow shaft.

Reference is now made to FIG. 1 in which there is illustrated an arrow shaft 10 with its arrow head 11 embedded in an object 12 shown in section. The arrow shaft 10, for purposes of illustration, is shown in a substantially flexed condition. The arrow center line 13 which is coincided with the arrow shaft 10 is shown displaced from horizontal axis 14. The flexed condition of the arrow is shown exaggerated in order to convey the nature of the bending moment that an arrow might experience upon impact with a solid and relatively impenatrable object. Illustrated to the right of arrow shaft 10 is force vector 16 (FV) which has a resultant force vector (RFV) 17. This RFV establishes a coupling moment about flex point 18 in the arrow shaft. In the event that the amount of bending experienced by the shaft 10 exceeds the elastic limit of the arrow shaft 10, shaft 10 will have induced therein a permanent bend. This bend, while imperceptably small at the outset, will continue to increase due to the shaft 10's loss of column rigidity.

While not shown in the drawing, it is readily apparent that similar bending moments in the shaft 10 may well arise when the archer attempts to remove the shaft 10 from the object 12. Whether the bend in the shaft 10 is caused by the arrow's impact or by the manual action of the archer grasping the shaft and pulling it free from the object, the shaft if bent over so slightly, will bend more readily upon similar impact when launched by the archer at another time.

Today's archers have found that tubular metal shafted arrows are amongst the most desirable, whether the shooting of arrows is in competition or for game in the field.

Accuracy in archery being the demanding art that it is gives little room for tolerating arrow flight inaccuracy. As a result of the archers' demand for enhanced arrow flight accuracy and the need to assure the archer in the field quickly and flawlessly that his arrow shaft is true and straight has given rise to the need for the creation of an arrow straightness gauge or tester to be next described.

Figures 2, 2A:
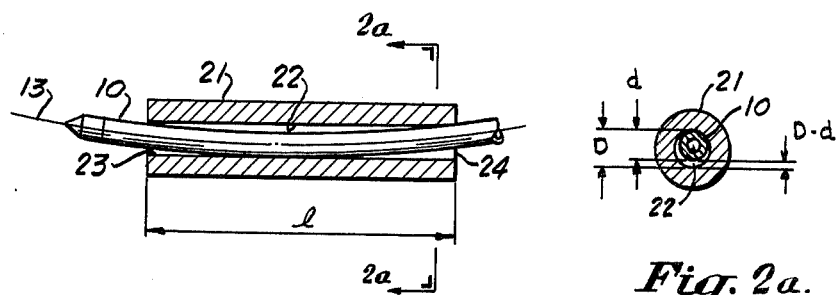
FIG. 2 is a cross-section of the arrow shaft straightness gauge embodying the invention shown in section.
FIG. 2a is a cross-sectional view taken along lines 2a—2a of FIG. 2.

Referring now to FIG. 2, there will be observed in cross-section an elongated body 21 which happens to have a circular cross-section as can be seen by a study of FIG. 2a. The external cross-sectional configuration is not cirtical to the invention being described. Centrally disposed throughout the length of the elongated body 21 is a circular cross-sectional passageway 22 which terminates with openings 23, 24. The openings 23 and 24 provide an entry or exit for the arrow shaft whose straightness is to be tested.

FIG. 2 and FIG. 2a which depict the preferred embodiment of the invention have been illustrated with the relative dimensions of the arrow shaft, and circular cross-sectional passageway in exaggerated detail in order to facilitate the description of the relative proportions of the invention which are critical to the operativeness of the invention.

It has been discovered that there exists a critical relationship between arrow shaft diameter (d), circular cross-sectional passage diameter (D), diametral clearance (D-d), and elongated body length (d), which can best be seen in a combined study of FIG. 2 and FIG. 2a.

It has been determined that given manufacturing tolerances for mass produced arrow shafts that minute variations in straightness can be tolerated in respect of the arrow's accuracy in flight. However, it has been determined that slight bends in the shaft that exceed a predetermined range should be corrected before the arrow is used again. In other words, the presence of even a minute lack of straightness of the arrow should be corrected before a bend occurs that may resist straightening.

Accordingly, it has been discovered that if the length of the passageway is no less than 0.1 the length of the arrow shaft and the cross-sectional diameter is equal to the arrow shaft to be tested plus a distance or measurement in the range of between 0.003 and 0.023 times the arrow shaft diameter then an arrow with acceptable straightness will readily pass through the gauge while a shaft with an unacceptable bend will bend in the passageway 22 as shown in FIG. 2.

It has also been discovered that because the criticality of the relative dimensions just noted that should the thermal co-efficients of expansion of the material which the elongated body is constructed differ from that of the arrow shaft, then the ambient temperature in which the gauge is employed could falsely affect the true results of the straightness test. For this reason, the material composition of the elongated body must have the same thermal co-efficients of expansion as the arrow shaft to be tested.

Figure 3:
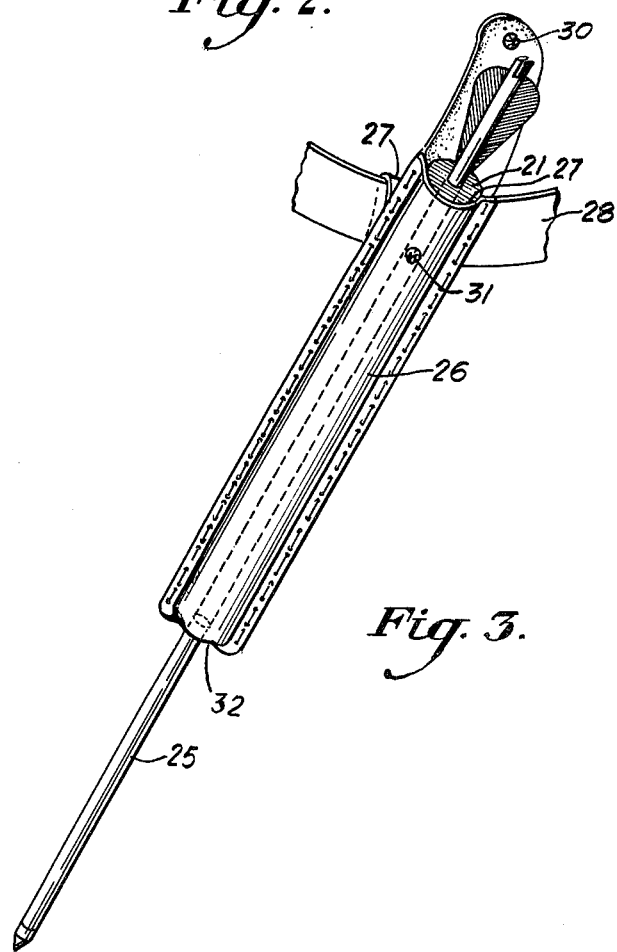
FIG. 3 is a three-dimensional illustration of an embodiment of the invention.

Referring now to FIG. 3, there will be seen that the gauge or tester 24 has been provided with a casing 26 which has openings 27, 32 at either end to allow as shown in this figure a straight arrow 25 to pass freely through the circular passageway 22. The casing 26 is provided with a flap 29 which includes fastening means 30, 31 to secure the flap 29 in a position such that foreign matter cannot readily enter the circular passageway 22. The casing 26 is also provided with means 27 in the form of a loop to receive a belt 28 carried on the body of the person using the arrow straightness gauge.

Although only a single preferred embodiment of the present invention has been illustrated and described, it will be apparent to those skilled in the art that various changes and modifications may be made to this embodiment without departing from the spirit of the invention as set forth in the claims.

What I claim is:

1. A completely portable easily carried on the person arrow shaft straightness tester for use in combination with an arrow shaft the straightness of which is to be ascertained,
   (a) said arrow straightness tester having an elongated body of preselected length,
   (b) said arrow shaft straightness tester having a circular cross-sectional passageway traversing the entire length of said elongated body and providing openings at both ends of said elongated body,
   (c) said arrow shaft having a preselected diameter and a preselected length,
   (d) said circular cross-sectional passageway having an internal diameter greater than said arrow shaft, thereby providing a diametral clearance between said arrow shaft to be tested and said internal diameter of said circular cross-sectional passageway,
   (e) said circular cross-sectional passageway having a diameter equal to said arrow shaft diameter to be tested plus a measurement in the range of between 0.003 and 0.023 times the arrow shaft diameter to be tested,
   (f) said elongated body of said arrow shaft straightness tester having a length no less than 0.1 said arrow shaft length the straightness of which is to be tested.

2. The arrow shaft straightness tester of claim 1 wherein said elongated body of said tester is of the same material composition as said arrow shaft to be tested, whereby an arrow with acceptable straightness will readily pass through the tester.

3. The arrow shaft straightness tester of claim 2, wherein said arrow shaft straightness tester includes in combination a casing physically surrounding said elongated body of said arrow shaft straightness tester.

4. The arrow shaft straightness tester of claim 3, wherein said casing is provided with means to readily secure and release said casing from the body of said person employing said arrow shaft straightness tester.

* * * * *